Figure 1:
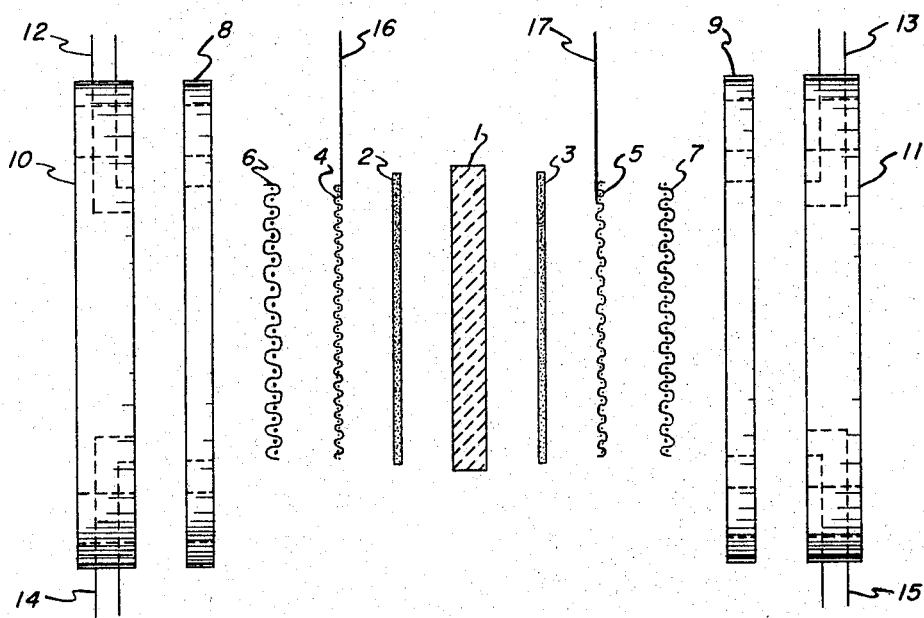

Aug. 9, 1966    M. L. MILLER ETAL    3,265,536
ALKALI SATURATED CROSS-LINKED POLYVINYL ALCOHOL
MEMBRANES AND FUEL CELL WITH SAME
Filed Dec. 11, 1962

INVENTOR.
Mary L. Miller
John Skogman
BY Judy Sutherland

ATTORNEY

3,265,536
ALKALI SATURATED CROSS-LINKED POLYVINYL ALCOHOL MEMBRANES AND FUEL CELL WITH SAME

Mary L. Miller, New York, and John Skogman, Yonkers, N.Y., and Judy Sutherland, Stamford, Conn., assignors to American Cyanamid Company, Stamford, Conn., a corporation of Maine
Filed Dec. 11, 1962, Ser. No. 243,863
13 Claims. (Cl. 136—86)

This invention relates to a novel alkalisaturated, cross-linked polyvinyl alcohol membrane and to methods for making the same. More particularly, it relates to a hydrophilic, alkali-saturated, cross-linked polyvinyl alcohol membrane containing an alkalistable filler substance uniformly embedded therein eminently suitable for use at ambient or elevated temperatures in hydrogen-oxygen containing gas fuel cells.

As is presently known, there is employed in a typical hydrogen-oxygen containing gas fuel cell an electrolyte confined in a gas-impermeable membrane. This membrane is usually paper or a suitable ion exchange resin embedded in a hydrophobic material, such as polyvinyl chloride, polytetrafluoroethylene or polyethylene. In the usual practice, an electrolyte saturated membrane is positioned between two electrodes, such as platinum black or platinized carbon, alone or in combination with a binder-waterproofing agent, such as polytetrafluoroethylene. Current collectors are next placed in a manner abutting the electrodes. Such collectors facilitate both the removal of electrons from the hydrogen electrode or the anode to the external circuit and the introduction of electrons from external circuit to the oxygen electrode or the cathode.

Unfortunately, hydrogen-oxygen fuel cells employing alkali electrolytes are not entirely satisfactory as a source of electrical energy. This is because the membranes usually employed suffer shortcomings in that they do not permit fuel cells to operate efficiently and economically. Membranes made from filter paper saturated with alkali electrolyte are not economical or effective, since the paper reacts with the alkali electrolyte and becomes a mass of pulp. Thus, the life of such membranes in fuel cells is short lived. To obviate the shortcomings of filter paper membranes, resort has been made to the use of ion exchange resins embedded in various hydrophobic resins. Similarly, such membranes are not very satisfactory, for the reason that water-gradients are set up. Water must then be removed from one side of the membrane with resultant dilution of electrolyte at one electrode and drying at the other. Hence, there remains a need for an efficient and economical membrane for use in an alkali electrolyte hydrogen-oxygen containing gas fuel cell.

It is, therefore, a principal object of the present invention to provide a cross-linked polyvinyl alcohol membrane which permits enhanced efficiency and performance in a fuel cell. It is a further object to provide a novel, alkali-saturated, cross-linked polyvinyl alcohol membrane which permits rapid equilibration of water as well as the improved flexibility of operation both with respect to gas flow rate and temperature. It is a still further object of the invention to provide a fuel cell containing a cross-linked, polyvinyl alcohol membrane which permits the fuel cell to be operative for a prolonged period at ambient or elevated temperatures with enhanced electrical energy output. These and other objects will become apparent from a consideration of the ensuing description.

In the operation of a typical hydrogen-oxygen containing gas fuel cell or a hydrogen-air containing fuel cell, the sites at which the electro-chemical reactions occur at the anode and at the cathode, are envisioned as involving the three phase contact of reactant gas, a catalyst embedded in an electrode and electrolyte. In the illustrative fuel cell of the type hereinbelow described, hydrogen ion and electrons are formed at the anode, whereas hydroxyl ions are formed at the cathode by the reaction of water, oxygen and electrons. The overall performance of such cells is in significant measure dependent upon the membrane separating the oxygen electrode or cathode from the hydrogen electrode or anode. Since the membrane employed must be impermeable to gas flow but permeable to hydroxyl ions flowing from the cathode to the anode so as to establish an electrochemical equilibrium state, water is primarily formed at the anode. Utilizing conventional membranes which are very slow to equilibrate with respect to water formed at the anode, serious difficulty has been experienced in eliminating it with resultant malfunction of the cell.

To obviate this and other difficulties, an improved cross-linked, alkali-saturated polyvinyl alcohol membrane has been unexpectedly discovered which provides for the rapid equilibration of water throughout the membrane-electrode structure. As stated previously, this water is formed during the operation of a hydrogen-oxygen containing gas fuel cell. The novel membrane which comprises cross-linked polyvinyl alcohol in which a major amount of an alkali-stable substance as a filler is embedded, surprisingly permits water formed on the side of the anode or hydrogen electrode to equilibrate rapidly throughout the membrane even to the cathode or oxygen electrode side. Equilibration of water and subsequent rapid removal of the water located on both sides of the membrane are rapidly effected. Thus, it is presently feasible to rapidly remove water only on the oxygen or cathode side while dead-ending the anode side by limiting hydrogen flow.

According to the present invention, a cross-linked, alkali-saturated polyvinyl alcohol membrane in which sundry alkali-stable substances as fillers are embedded, are prepared in a straightforward manner. The alkali-stable substances are added to an aqueous solution of polyvinyl alcohol containing a cross-linking agent. Resultant mixture is then stirred, formed into sheets of any desired thickness, usually between 20 and 35 mils, and finally cured in the usual manner. The sheet or membrane is next saturated in or treated with an aqueous solution of alkali, such as sodium hydroxide, or potassium hydroxide, for from one to five hours or longer. Resultant sheet or membrane is ready for use in a fuel cell.

In general, the embedded material incorporated into cross-linked polyvinyl alcohol includes any suitable alkali-stable substance. For instance, commercially available cation exchange resin or anion exchange resin can be employed. Illustrative resins are: aminated polychloromethylstyrene, melamine-formaldehyde resin, urea-formaldehyde resin, quaternary ammonium polymers, phenol-sulfonic acid-formaldehyde resin and sulfonated polystyrene resin. Further, hydrophobic resins, such as polystyrene and polytetrafluoroethylene can also be advantageously employed. In addition, inorganic embedded or filler materials, such as natural and synthetic carbons, asbestos, titanium dioxide, silicon carbide and the natural and artificial zeolites as illustrative inorganic ion exchange materials, are similarly advantageously employed.

The particle size of the embedded or filler materials can be varied over a wide range, usually from about 0.03 micron to 300 microns in diameter. It is found, however, that for optimum performance a particle size range between 40 microns and 80 microns is preferred.

In general, the amount of the filler, usually not less than about 25 percent and not more than about 85 percent, is added to a polyvinyl alcohol solution, based on the weight of total solids consisting of said cross-linked polyvinyl alcohol and alkali-stable filler. It is preferred, however, to employ for optimum operation between 50 percent and 70 percent of the filler material.

The polyvinyl alcohol can be cross-linked in accordance with procedures known in the art. Thus, the alcohol can be treated with a cross-linking agent, such as formaldehyde, glyoxal or epichlorhydrin, a diglycidyl ether and equivalents thereof, in small amounts of a mineral acid, as for instance hydrochloric or sulfuric acid. It is a good practice to add the filler material to the polyvinyl alcohol solution containing from 8 percent to 12 percent polyvinyl alcohol, the remainder being water, and the cross-linking agent in the present of a mineral acid. The polyvinyl alcohol resin is then cured.

In order to further clarify the invention, these and other non-limitative embodiments thereof are shown in the accompanying drawing and will be described in detail in conjunction with said drawing.

Figure 2:
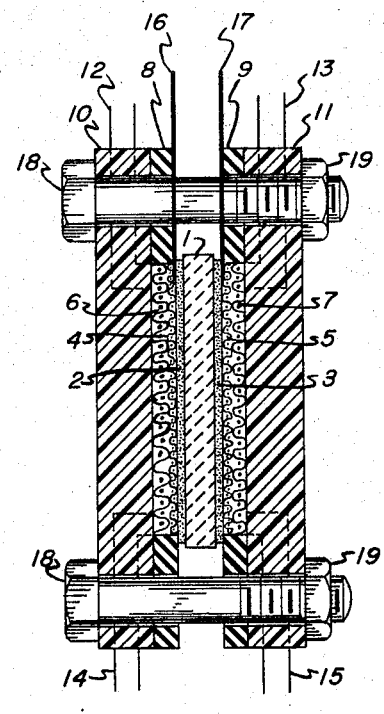

In the drawing:

FIG. 1 is an exploded plan view partially in section, of a fuel cell employing the cross-linked polyvinyl alcohol membrane of the present invention; and FIG. 2 is a partially expanded side view, partially in section of the fuel cell of FIG. 1.

In FIG. 1, a membrane 1, as prepared by the method of the present invention, is positioned between platinized electrodes 2 and 3. Abutting the latter electrodes are current collector screens 4 and 5 which comprise stainless steel or other suitable inert metal. Stainless steel wire mesh spacers 6 and 7 are employed to compress the collector screens against the electrodes. This provides for better contact between the screens and the electrodes as well as the electrodes and the membrane. The wire mesh spacers are positioned exteriorly to the current collectors. To the outside of the spacers are gaskets 8 and 9 comprising any suitable inert material, such as silicon rubber. These seal as well as separate the chambers containing the reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17, connected to current collector screens 4 and 5 are the conductive members through which current flows from and to the fuel cell when the latter is in operation. The cell is secured by means of bolts 18 and nuts 19 as shown in FIG. 2.

The invention will be illustrated in conjunction with the following examples which are to be taken as illustrative only and not by way of limitation. All parts are by weight unless otherwise stated.

EXAMPLE 1

Into a suitable reaction vessel are added 3 parts of a copolymer of chloromethyl styrene and divinyl benzene containing 9.2 parts of chloromethyl-styrene and 0.8 part of divinyl benzene, 20 parts of dioxane and 2.5 parts of 3,3'-diaminodipropylamine. Resultant mixture is heated for four hours at 90° C. The aminated resin is then washed with water, dried and ground until particles of less than 300 microns are obtained. In the chloride form, the resin has a capacity of 3.46 milliequivalents per gram of dry resin.

To (a) 2.0 parts of a polyvinyl alcohol solution prepared by dissolving 9 parts of polyvinyl alcohol in 100 parts of water, (b) 0.25 part of 36% aqueous formaldehyde (formalin) and (c) 0.25 part of sulfuric acid are added with agitation 0.5 part of the ground aminated copolymer of chloromethyl styrene prepared above. Resultant mixture is poured into a suitable frame and cured at 55° C. for two hours. The latter is then removed from the frame and satutrated in or treated with 25 percent (5 N) aqueous potassium hydroxide solution. Thereafter, it is used to prepare a hydrogen-oxygen fuel cell as defined hereinabove.

The cell's performance is shown in Tables I and II below both at ambient temperatures and at 80° C., respectively.

EXAMPLE 2

The procedure of Example 1 is repeated in every respect, except that as a substitute for 3,3'-diaminodipropylamine, the aminating reagent used is a mixture of 1.25 parts of dimethyl aminoethanol and 1.25 parts of diethylenetriamine. Resultant aminated polymer has a capacity in the chloride form of 2.2 milliequivalents per gram of dry resin.

To (a) 2.0 parts of a polyvinyl alcohol solution (prepared by dissolving 9 parts of polyvinyl alcohol in 100 parts of water), (b) 0.25 part of 36% aqueous formaldehyde (formalin) and (c) 0.25 part of sulfuric acid are added under agitation 0.5 part of hereinabove prepared aminated copolymer of chloromethyl styrene. Resultant mixture is poured into a suitable frame and cured at 55° C. for six hours. The latter is then removed from the frame, washed in water and saturated in a 5 N aqueous potassium hydroxide solution. Thereafter, it is used as the separator membrane in the preparation of a hydrogen-oxygen containing fuel cell as defined hereinabove. The cell's performance at ambient temperature is shown in Table I below.

TABLE I

*Performance of hydrogen-oxygen containing fuel cell at ambient temperature (~ 25° C.)*

| Membrane | Oxygen-containing gas | Current density (ma./cm.²)* | Voltage after operating for— | | | | |
|---|---|---|---|---|---|---|---|
| | | | 10 hrs. | 20 hrs. | 60 hrs. | 100 hrs. | 190 hrs. |
| Polyvinyl alcohol without filler. | Oxygen | 20 | [0.2 after 1 Hour] | | | | |
| Example 1 | do | 140 | 0.71 | 0.70 | 0.70 | 0.70 | 0.70 |
| Example 1 | Air | 65 | 0.69 | 0.65 | 0.65 | | |
| Example 2 | Oxygen | 60 | 0.66 | 0.64 | 0.61 | 0.58 | 0.56 |

*Milliamperes per square centimeter.

EXAMPLE 3

The separator membrane is prepared by following the procedure of Example 1, except that crystalline polystyrene, sulfonated polystyrene or polytetrafluoroethane is used in lieu of the aminated chloromethyl styrene polymer. Performance of the resultant membrane is shown in Table II below.

EXAMPLE 4

Sundry inorganic fillers are employed to prepare a polyvinyl alcohol membrane.

Following the procedure of Example 1, two parts of filler as shown in Table II are each added to one part of polyvinyl alcohol. Resultant membranes are then employed in hydrogen-oxygen containing gas fuel cells and the results are tabularized in Table II below.

TABLE II

*Performance of a hydrogen-oxygen containing fuel cell at 80° C., 120–140 ma./cm.² [1]*

| Membrane—Cross-Linked Polyvinyl Alcohol (1 part), Filler Additive (2 parts) | Voltage After Operating for— | | | | |
|---|---|---|---|---|---|
| | 2 hrs. | 6 hrs. | 10 hrs. | 15 hrs. | 20 hrs. |
| Resin (Ex. 1) | 0.67 | 0.67 | 0.67 | 0.67 | 0.67 |
| Activated Charcoal | 0.71 | 0.70 | | | |
| Polytetrafluoroethylene (Ex. 3) | 0.61 | 0.50 | 0.43 | 0.35 | |
| Sulfonated Polystyrene (Ex. 3) | 0.81 | 0.80 | 0.79 | 0.78 | 0.78 |
| Polystyrene [crystalline] (Ex. 3) | 0.56 | 0.54 | 0.49 | 0.40 | |
| TiO₂ (Ex. 4) | 0.76 | 0.75 | 0.75 | 0.73 | |
| TiO₂ (Ex. 4) | 0.80 | 0.82 | 0.82 | | |
| Blue Asbestos (Ex. 4) | 0.80 | 0.81 | | | |
| Potassium Salt of Zeolite (Ex. 4) | 0.72 | 0.72 | 0.72 | 0.72 | 0.72 |
| Zirconium Oxyphosphate (Ex. 4) | 0.66 | 0.66 | 0.64 | 0.60 | 0.61 |
| Control (Microcrystalline Cellulose) | 0.05 volt at 1 hour; 0 volt at 2 hours; no current | | | | |

[1] Milliamperes per square centimeter.

From a consideration of the above tables, it will be noted that the addition of an alkali-stable filler to a polyvinyl alcohol membrane markedly enhances its use as a fuel cell membrane. Further, it is an advantage of the present invention that the membranes prepared hereinabove permit a proper water balance to be maintained in the fuel cell under operating conditions. Thus, the membranes unexpectedly permit water equilibration which makes possible the production of hydrogen-oxygen containing fuel cells that are particularly capable of operation over prolonged periods of time, at elevated temperatures.

We claim:

1. A substantially self-sustaining membrane being adapted for use in a hydrogen-oxygen containing gas fuel cell at both ambient and elevated temperatures comprising a water-insoluble, alkali-saturated, cross-linked polyvinyl alcohol having embedded therein from about 25 percent to about 85 percent alkali-stable filler based on the weight of total solids consisting of said cross-linked polyvinyl alcohol and alkali-stable filler, said filler being in particle form of from 0.03 micron to about 300 microns in diameter and wherein said membrane when employed in a hydrogen-oxygen containing gas fuel cell maintained at 80° C. yields after two hours a voltage of at least 0.56 volt and a current between about 120 milliamperes per square centimeter and 140 milliamperes per square centimeter.

2. The membrane of claim 1, wherein the said filler particles are present in an amount ranging between about 50 percent and 70 percent, based on the weight of the total solids consisting of said cross-linked polyvinyl alcohol and alkali-stable filler.

3. The membrane of claim 2, wherein the said filler particles are aminated polychloromethyl styrene.

4. The membrane of claim 2, wherein the said filler particles are silicon carbide.

5. The membrane of claim 2, wherein the said filler particles are sulfonated polystyrene.

6. The membrane of claim 2, wherein the said filler particles are potassium zeolite.

7. The membrane of claim 2, wherein the said filler particles are alkali-stable asbestos.

8. A hydrogen-oxygen containing gas fuel cell, wherein the membrane positioned between pair of electrodes is a substantially self-sustaining membrane positioned between said electrodes, said membrane comprising a water-insoluble, alkali-saturated, cross-linked polyvinyl alcohol having embedded therein from about 25 percent to about 85 percent alkali-stable, inert filler, based on the weight of total solids consisting of said cross-linked polyvinyl alcohol and alkali-stable filler, said filler being in particle form of 0.03 micron to about 300 microns in diameter, said membrane being adapted to rapidly equilibrate water formed during use and wherein said membrane when employed in a hydrogen-oxygen containing gas fuel cell maintained at 80° C. yields after two hours a voltage of at least 0.56 volt and a current between about 120 milliamperes per square centimeter and 140 milliamperes per square centimeter.

9. The gas-fuel cell of claim 8, wherein the filler particles are aminated polychloromethyl styrene.

10. The gas-fuel cell of claim 8, wherein the filler particles are silicon carbide.

11. The gas-fuel cell of claim 8, wherein the filler particles are potassium zeolite.

12. The gas-fuel cell of claim 8, wherein the filler particles are alkali-stable asbestos.

13. The gas-fuel cell of claim 8, wherein the filler particles are sulfonated polystyrene.

References Cited by the Examiner

UNITED STATES PATENTS

| | | | |
|---|---|---|---|
| 489,551 | 3/1892 | Waite | 204—296 |
| 2,647,938 | 8/1953 | Taylor | 136—107 |
| 2,648,717 | 8/1953 | Ross et al. | 136—146 X |
| 2,681,376 | 6/1954 | Denison et al. | 136—144 |
| 2,708,683 | 5/1955 | Eisen | 136—120.1 |
| 2,747,009 | 5/1956 | Kirkwood et al. | 136—157 X |
| 2,805,196 | 9/1957 | Roebersen et al. | 204—296 |
| 2,913,511 | 11/1959 | Grubb | 136—86 |
| 3,013,100 | 12/1961 | Mendelsohn et al. | 204—296 |
| 3,021,379 | 2/1962 | Jackel | 136—146 |
| 3,097,116 | 7/1963 | Moos | 136—120 |

FOREIGN PATENTS

| | | |
|---|---|---|
| 312,713 | 6/1929 | Great Britain. |
| 893,328 | 4/1962 | Great Britain. |

WINSTON A. DOUGLAS, *Primary Examiner.*

JOHN H. MACK, *Examiner.*